C. E. WHITE.
BEET CULTIVATOR.
APPLICATION FILED MAR. 21, 1908.
1,057,022.
Patented Mar. 25, 1913.
3 SHEETS—SHEET 1.
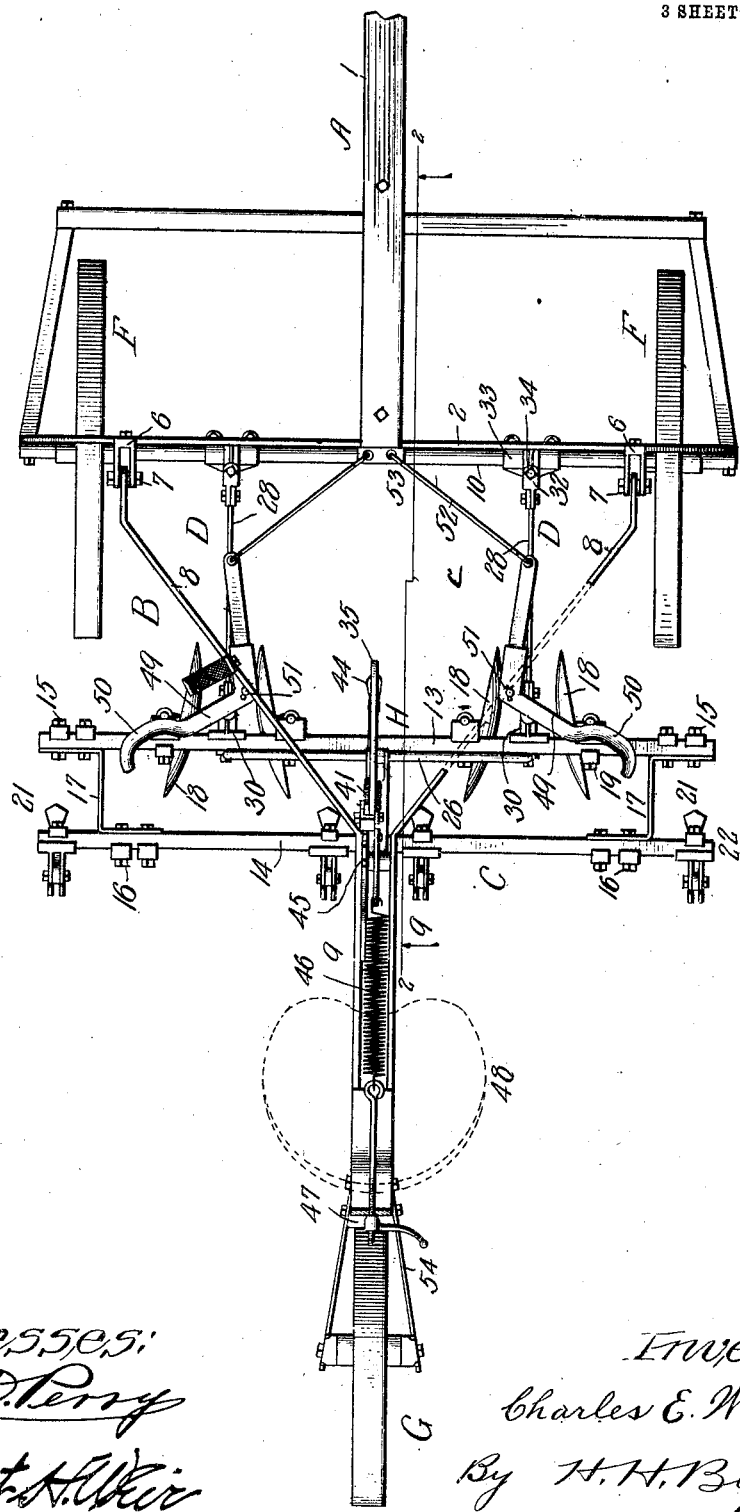
Witnesses:
Inventor,
Charles E. White
By H. H. Bliss
atty.

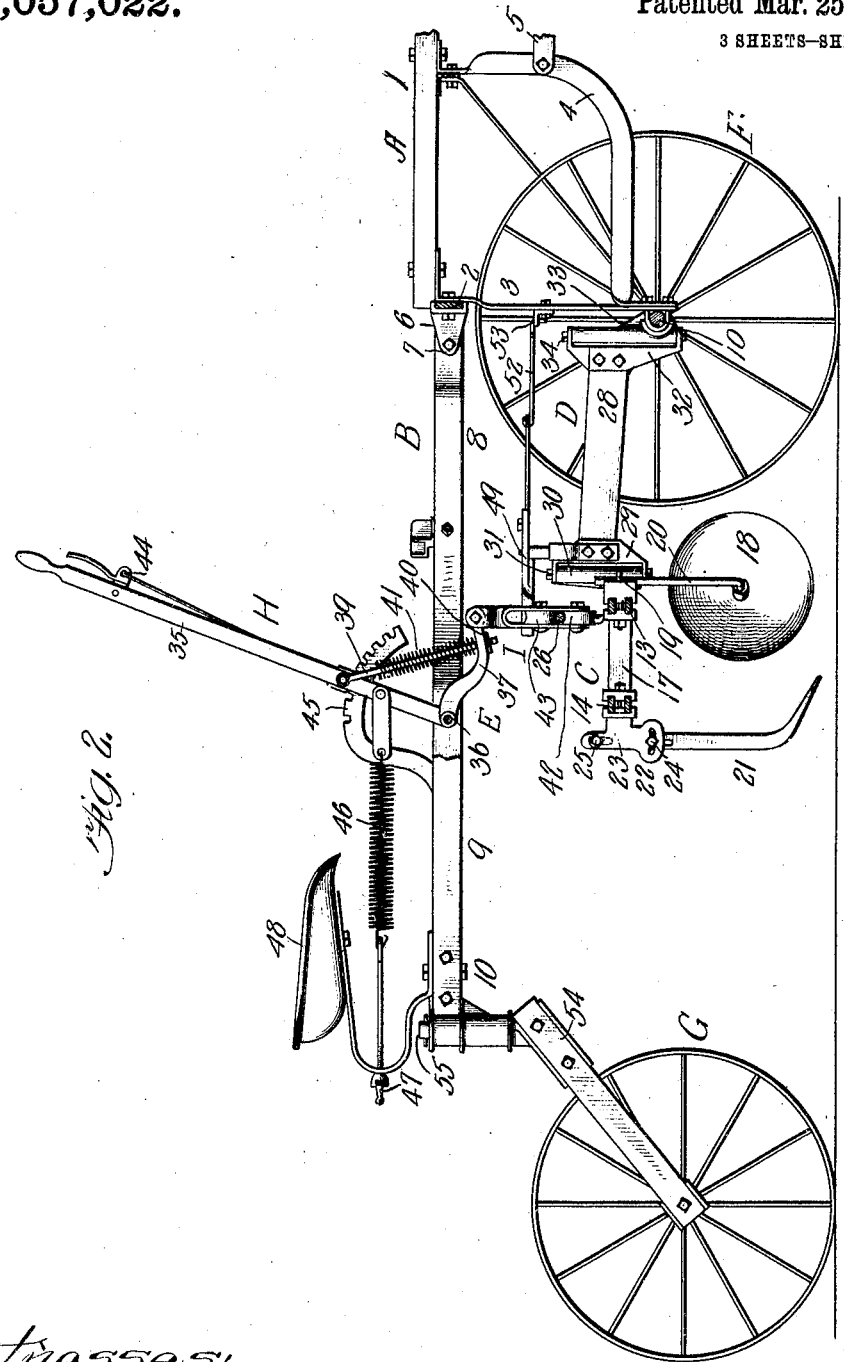

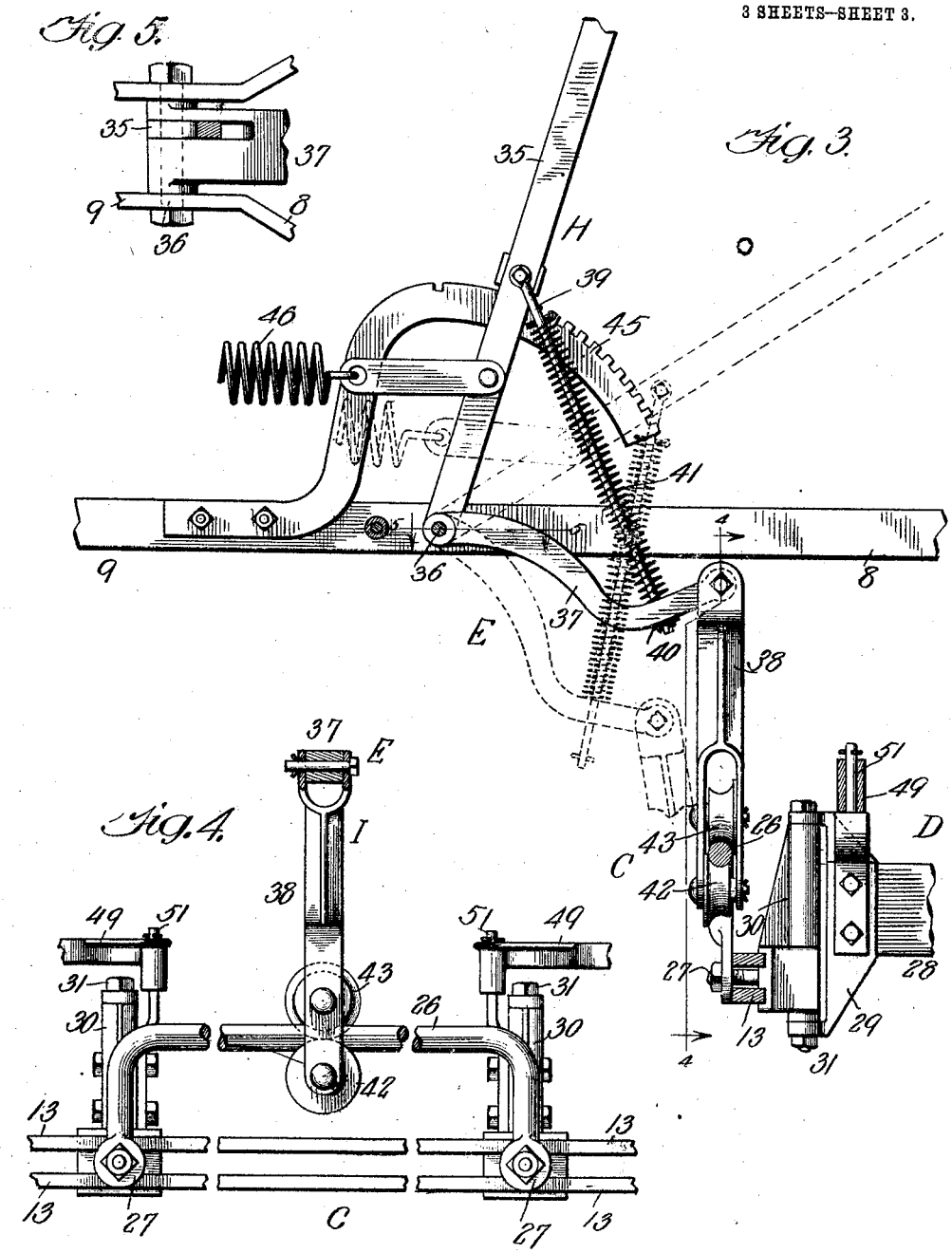

UNITED STATES PATENT OFFICE.

CHARLES E. WHITE, OF MOLINE, ILLINOIS, ASSIGNOR TO DEERE & MANSUR COMPANY, OF MOLINE, ILLINOIS, A CORPORATION.

BEET-CULTIVATOR.

1,057,022.  Specification of Letters Patent.  Patented Mar. 25, 1913.

Application filed March 21, 1908. Serial No. 422,508.

*To all whom it may concern:*

Be it known that I, CHARLES E. WHITE, citizen of the United States, residing at Moline, in the county of Rock Island and State of Illinois, have invented certain new and useful Improvements in Beet-Cultivators, of which the following is a specification, reference being had therein to the accompanying drawing.
This invention relates to improvements in cultivating implements and has for its object to provide a novel arrangement of framework, supporting devices, and adjusting devices for tool-carrying parts so that the implement as a whole can be readily governed and the tools or operative parts can be put under fixed adjustment such as may be desired, and also readily permit the delicate movements and adjustments which may be desired by the operator while the machine is in operation.

Referring to the drawings, Figure 1 is a plan view of a cultivating implement embodying my improvements; Fig. 2 is a longitudinal vertical section on the line 2—2 of Fig. 1; Fig. 3 is a view partly in side elevation and partly in vertical section showing the devices for vertically suspending and adjusting the tool frame on a scale somewhat larger than that upon which the parts are shown in Figs. 1 and 2; Fig. 4 is a vertical transverse section taken on the line 4—4 of Fig. 3; and Fig. 5 is a detail of the ends of the lifting lever and suspender arm and the pivot which secures them to the frame.

The machine may be regarded as having the following frame elements: A indicates the draft frame, B a rearward extending frame hinged to the draft frame, C the frame which directly carries the plow, hoes and disks or earth tools, D the frame or bars for connecting the tool frame to the draft frame, and E the parts by which the tool frame is suspended and adjusted vertically.
Referring to the draft frame A, 1 is a tongue or pole of any suitable sort. At the rear end it is secured to a cross-bar 2 which at its ends is turned or carried down to the axle 10, upon which are mounted two main ground wheels F. The tongue or pole is connected to this cross-bar 2 and to the axle 10 by a vertical bar 3. 4 is a supplemental connecting bar interposed between the axle and the tongue at a point suitably far forward from its rear end, and to this bar 4 a clevis or draft device can be secured at 5 as desired.

The frame element B is composed of bars each bent to have at the front divergent arms 8, 8, and at the rear parallel and comparatively closely placed arms 9, 9. The arms 8, 8 at their front ends are connected by pivots 7 to the bracket supports 6 which are secured to the draft frame, said pivots being preferably arranged directly above the wheel axis or substantially so. The arms 9, 9 extend back to and are rigidly joined to a casting at 10 for the attachment of the rear wheel G.

The tool-carrying frame, indicated as an entirety by C, comprises a front cross-bar or pair of bars 13 and a rear cross-bar or bars 14, a short distance behind and parallel to the bar or bars 13. As shown, there are two bars 13 and these are spaced apart but rigidly held together by bolted clamps 15. The rear cross-bars 14 are also held in a similar way by the bolted clamps 16, and the front element and the rear element of this frame C are spaced and braced by the bars 17 secured by the clamping bolts at 15 and 16.

The front element of the tool frame is shown as provided with concavo-convex disks 18, each of which is capable of being adjusted vertically as well as horizontally. Each is supported by a vertical rod 20 which at its upper end is secured by a clamping device at 19 which permits the rod 20 to be adjusted vertically as desired, or to be turned around a vertical axis and clamped in position so as to vary the angle of the disk to the line of travel of the vehicle. Moreover, these clamping devices at 19 can be loosened and adjusted along the bars 13 outward or inward, as desired, either to provide for varying the distance between the rows of plants, or for setting the disk of each pair closer together, or farther apart.

The rear element of the tool frame C is provided with a series of cultivator shoes or hoes 21. These are carried by bolted clamps at 22 which can be set at any desired position along the bars 14. Each of the clamps has outwardly extending plates 23 and between these are placed the standard or shank of one of the hoes or shoes, and the latter can be adjusted forward or backward by means of the bolt and slots at 24, the bolt at 25 serving as a pivot around which such adjustment can be effected; and vertical adjustment of the vertical shanks is provided by forming suitable slots lengthwise of the shanks.

The tool frame can be as long as required, on lines transverse to the machine, so as to carry in practice any number of tools, such as disks, shovels or hoes. As shown, two pairs of disks are provided and hoes sufficient in number to cultivate the space between two rows of plants and to partially cultivate the ground on the outer sides of the said rows. But it will be understood that the number can be varied as desired. In some cases I employ a frame long enough to cultivate four rows of plants.

This implement being particularly designed for the cultivating of beet plants, it is desirable that the tool-frame should be capable of delicate and quick movement laterally at the will of the operator and also capable of vertical adjustment as desired, of being subjected to variable downward pressure to secure proper penetration of the tools, and of a vertical yielding when in working position.

The connecting devices at D which connect the tool frame to the draft-frame are such as to permit great flexibility. These connections consist of bars 28, 28, each of which is at its rear end secured to a casting 29 which is fitted to a coupling sleeve formed on the castings 30. The latter are adjustably clamped to the bars 13 of the tool frame, 31 being a pivot bolt which connects the castings 29 and 30, the clamping bolt for the latter being shown at 27. At the front end each of these bars 28 is coupled to the draft-frame by castings at 32 and 33 with vertical pivot bolts 34 similar to those just above described.

A coupling of this character permits the tool frame to be easily shifted laterally right or left with relation to the draft-frame, as may be desired.

The weight of the tool frame is sustained and its vertical adjustments are effected by means of the suspending and adjusting mechanism indicated as an entirety by E, this including a lever system at H and a link support at I. 35 is a hand lever pivoted at 36 to the frame B. 37 is an arm also pivoted at 36 and connected by a rod 39 to the lever 35, this rod being pivoted to the arm 35 and passing loosely through the arm 37. At 40 there is a stop which prevents the arm 37 from separating from the lever 35 beyond the desired distance, but which permits the arm to move upward toward the lever. Such upward movement is resisted by a spring 41 surrounding the rod 39 and bearing in one direction against the arm and in the other against the lever, or a stop adjacent thereto.

To the arm 37 is pivotally connected the suspenders which consist of a link 38 loosely connected to the tool-frame by means of a guide bar or rail 26 having its horizontal part arranged between the lower support on the link 38 and a stop above it, also on the link. This support and stop are preferably of the form of anti-friction rollers 42 and 43 mounted in a fork at the lower end of the link. The guide 26 can be of simple form, when made as shown, it being bent to have short downward turned legs which are secured to the front part of the tool-frame by the above-described clamping bolts at 27.

It will now be seen that the tool-frame is not only connected to the draft frame but is suspended from the rearward extending frame B in such way as to have great flexibility in its attachments. The operator, riding in the seat at 48, can with his foot throw the tool-frame to the right or to the left at any instant he desires. To assist him in accomplishing this with the utmost ease I provide two similar foot lever systems, one on the right and one on the left. Each comprises a lever 49, the outer end of which has a foot stirrup 50 and which is pivoted at 51 to the laterally moving parts, preferably to one of the castings 29. The front end of this hinged bar or lever 49 is flexibly connected by a link 52 to the draft-frame at 53. The levers 49 and 52 constitute a toggle lever structure by which the power exerted by the operator's foot may be made more efficient in shifting the tool-frame, said frame being moved to the right by forward pressure on the right foot stirrup and to the left by similar pressure on the left foot stirrup. When riding in his seat at 48, as aforesaid, the operator has perfect control of the lateral position of the tools through the stirrups and levers upon which his feet rest and with which they engage. The lever 35 is provided with a detent and thumb latch at 44 of the common kind, the detent being adapted to engage with one or another of the teeth in the ratchet segment 45.

From the above description of the parts 35, 37, 39 and 41, it will be seen that although the tools can be so adjusted and held that their operating points or edges shall be prevented from passing below a predetermined horizontal plane, they can rise automatically under pressure from below, because of the yielding of the spring 41 and the capability of the arm 37 to rise to some extent with relation to the lever 35; but the spring 41 under ordinary circumstances acts to press the tool-frame down and hold the tools to their work. This downward pressure exerted upon the tools by the spring may be varied by movement of the lever 35 so as to vary the penetration of the tools and maintain them at any desired depth. This is done, furthermore, without affecting in any way the balance of the draft frame, or the weight on the horses' necks, because the pressure is thrown upon the rear frame B which, as previously stated, is pivoted to the draft frame directly above the axis of the wheels.

While the downward pressure exerted by the spring may be varied by adjustment of the hand wheel 35, as stated, it is to be observed that for any given position of the lever the spring maintains a substantially constant downward pressure upon the tool frame in all positions of its lateral adjustment.

46 is a spring connected to the lever 35 above its pivot 36 and extending backward to an adjustable attachment at 47. This spring assists the operator in lifting the tool frame upward when it is desired to throw the tools entirely out of action; or, when it is desired to adjust them to higher positions.

The rear wheel G is mounted in a castering frame 54 connected to a vertical pivot 55 mounted in the above-mentioned casting at 10.

Although I have above described in detail all the parts of a cultivating implement embodying my improvements it will, of course, be understood that in many respects there can be modifications without departing from the essential features of the invention.

By having the tool frame supported at the front in the way described, it will be seen that although it is free to rise and fall at the rear in vertical planes, it can be adjusted transversely in such way as to be maintained in parallelism at all times, that is in parallelism with the transverse lines of the machine so that each of its positions will be in parallelism with its other positions. Consequently the working faces of the hoes or tool will always be kept in similar relation to the soil with which they contact and to the lines of draft along which they are carried. The sliding connection between the tool frame and the suspending devices which I provide, assists materially toward the attainment of this result in a satisfactory manner.

As above described the elongated guide support is carried by the tool frame but there can be modification in this respect and the suspending devices could have the elongated part.

While it is not essential that the rear frame which is hinged to the front frame should be mounted upon a single caster wheel, there are numerous advantages in a construction having the parts constructed and arranged in the way shown. The rear hinged frame will readily follow the proper lines of travel under the government of the front frame or draft frame. The hanger or holder at 38 by being hinged to the suspending bar 37 can swing sufficiently longitudinally of the machine to permit the free lateral movements of the tool frame, and this hanger or holder 38 is to be regarded as capable of yielding vertically as well as the suspender 37, both of these parts having an upward movement against the action of the spring 41, and both being actuated when the lever 35 is moved.

The foot lever system combined with the tool frame is operated easily and applies power efficiently, being connected by hinged supports to the tool frame, and also positively connected to one of the other frames, preferably the front frame or draft frame, as shown.

What I claim is:

1. The combination of the draft frame, the tool frame laterally adjustable in parallelism in its several positions, the suspending devices for the tool frame having laterally movable engagement therewith, the spring arranged to press the suspending devices downward, and the lever for positively lifting said suspending devices, substantially as set forth.

2. The combination of a draft frame, a tool frame laterally adjustable in parallelism in its several positions, suspending devices for the tool frame having laterally movable engagement therewith, and a central spring and lever arranged respectively to press the suspending devices downward and to lift said suspending devices.

3. The combination of a draft frame, a tool frame laterally adjustable in parallelism in its several positions, suspending devices for the tool frame having laterally adjustable engagement therewith, a rod connected with the suspending devices, a spring connected with the suspending devices, and a lever connected with said rod for lifting said suspending devices and arranged to compress the said spring.

4. The combination of a draft frame, a tool frame laterally adjustable in parallelism in its several positions, suspending devices for the tool frame having laterally movable engagement therewith, a spring arranged to press the suspending devices downward, a lever for lifting said suspending devices, foot levers at each side of the tool frame and pivoted thereon and having arms extending forward toward the draft frame, and links arranged at an angle to said arms and pivotally connected therewith and with the draft frame.

5. The combination of a draft frame, a tool frame laterally adjustable in palallelism in its several positions, suspending devices for the tool frame having laterally movable engagement therewith, and a central spring and lever arranged respectively to press the suspending devices downward and to lift said suspending devices, foot levers at each side of the tool frame and pivoted thereon and having arms extending forward toward the front part of the draft frame, and links arranged at an angle to said arms and pivotally connected therewith and with the draft frame.

6. The combination of a draft frame, supported from the ground at three points, a tool frame laterally adjustable in parallelism in its several positions, suspending devices for the tool frame having laterally movable engagement therewith, and a central spring and lever arranged respectively to press the suspending devices downward and to lift said suspending devices.

7. The combination of a two wheeled draft frame, a rearwardly extending frame hinged to the draft frame and having at its rear part a supporting ground wheel, the tool frame laterally adjustable in parallelism in its several positions, the suspending devices for the tool frame having laterally movable engagement therewith, foot levers at each side of the tool frame and pivoted thereon and having arms extending forward toward the draft frame, and links arranged at an angle to said arms and pivotally connected therewith and with the draft frame.

8. The combination of a two wheeled draft frame, a rearwardly extending frame hinged to the draft frame and having at its rear part a supporting ground wheel, the tool frame laterally adjustable in parallelism in its several positions, the suspending devices for the tool frame having laterally movable engagement therewith, the spring arranged to press the suspending devices downward, a lever for lifting said suspending devices, foot levers at each side of the tool frame and pivoted thereon and having arms extending forward toward the draft frame, and links arranged at an angle to said arms and pivotally connected therewith and with the draft frame.

In testimony whereof I affix my signature, in presence of two witnesses.

CHARLES E. WHITE.

Witnesses:
F. F. HATCHER,
J. H. BUSHONG.

---

Copies of this patent may be obtained for five cents each, by addressing the "Commissioner of Patents, Washington, D. C."